United States Patent
Orati et al.

(10) Patent No.: US 10,002,276 B2
(45) Date of Patent: Jun. 19, 2018

(54) BARCODE-READING DEVICE AND MACHINE INCLUDING SUCH A DEVICE FOR AUTOMATED ANALYSIS OF A SAMPLE

(71) Applicant: BIOMÉRIEUX, Marcy l'étoile (FR)

(72) Inventors: Luca Orati, Florence (IT); Veronica Lucia Rossi, Arezzo (IT)

(73) Assignee: BIOMERIEUX, Marcy l'Etoile (FR)

( * ) Notice: Subject to any disclaimer, the term of this patent is extended or adjusted under 35 U.S.C. 154(b) by 0 days. days.

(21) Appl. No.: 15/508,165

(22) PCT Filed: Sep. 8, 2015

(86) PCT No.: PCT/FR2015/052376
§ 371 (c)(1),
(2) Date: Mar. 2, 2017

(87) PCT Pub. No.: WO2016/038291
PCT Pub. Date: Mar. 17, 2016

(65) Prior Publication Data
US 2017/0255804 A1 Sep. 7, 2017

(30) Foreign Application Priority Data
Sep. 12, 2014 (FR) .................. 14 58577

(51) Int. Cl.
*G06K 7/10* (2006.01)
*G06K 7/14* (2006.01)

(52) U.S. Cl.
CPC ....... *G06K 7/1413* (2013.01); *G06K 7/10564* (2013.01)

(58) Field of Classification Search
USPC .................. 235/462.14, 462.22–462.45, 235/462.32–462.37, 462.43
See application file for complete search history.

(56) References Cited

U.S. PATENT DOCUMENTS

| | | |
|---|---|---|
| 4,591,242 A | 5/1986 | Broockman et al. |
| 5,175,421 A | 12/1992 | Harris |
| 5,326,962 A | 7/1994 | Peng |
| 5,473,149 A | 12/1995 | Miwa et al. |

(Continued)

FOREIGN PATENT DOCUMENTS

WO 2007/149876 A2 12/2007

OTHER PUBLICATIONS

Non-English International Search Report dated Jan. 13, 2016 for Application No. PCT/FR2015/052376.

*Primary Examiner* — Tuyen K Vo
(74) *Attorney, Agent, or Firm* — Ladas & Parry LLP (57) ABSTRACT

A bar code reader device (10) having a bar code reader apparatus (12) with: a) a light emitter system (14); b) a light recovery system (28) capable of recovering light reflected from a working viewing zone through a reflected light conditioning system (30); and c) a photoelectric sensor. The device (10) includes an auxiliary optical system (36) that is arranged permanently in the working viewing zone at a distance from the sensor (26) and in series with the reflected light conditioning system (30) in such a manner that a fraction, but not all, of the working viewing zone is intercepted by the auxiliary optical system (36).

24 Claims, 5 Drawing Sheets

(56) References Cited

U.S. PATENT DOCUMENTS

| | | | |
|---|---|---|---|
| 6,024,283 A * | 2/2000 | Campanelli | G06K 7/10574 235/462.32 |
| 6,820,811 B1 | 11/2004 | Detwiler | |
| 6,909,080 B2 | 6/2005 | Patel et al. | |
| 7,762,466 B2 | 7/2010 | Tan et al. | |
| 2001/0038037 A1 * | 11/2001 | Bridgelall | G06K 7/10851 235/462.14 |
| 2003/0201328 A1 | 10/2003 | Jam et al. | |
| 2007/0057064 A1 * | 3/2007 | Schneider | G06K 7/10851 235/462.33 |
| 2009/0127341 A1 * | 5/2009 | Feng | G06K 7/10702 235/462.08 |
| 2010/0155485 A1 * | 6/2010 | Tan | G06K 7/10702 235/462.42 |
| 2012/0228381 A1 * | 9/2012 | Drzymala | G06K 7/10554 235/440 |
| 2013/0200157 A1 * | 8/2013 | Nunnink | G06K 7/1491 235/462.22 |

\* cited by examiner

BARCODE-READING DEVICE AND MACHINE INCLUDING SUCH A DEVICE FOR AUTOMATED ANALYSIS OF A SAMPLE

The invention relates to a bar code reader device and to a machine for automatically analyzing a sample, the machine including such a device.

Bar code systems are used in very many applications for coding information in a format that is easily readable by automatic optical reader devices. A bar code itself is a graphical image that, in its most common variant, is made up of a series of bars arranged side by side. The bars may present different thicknesses and they are spaced apart from one another by gaps. The bars are generally black or dark, while the gaps between the bars are in a color with black, i.e. a pale color, generally white. By way of example, such bar codes are defined by systems known as "EAN 8", "EAN 13", "code 39", "code 128", "POSTNET", etc. It should be observed that there also exist systems belonging to the bar code family that, properly speaking, do not present bars, but that present black modules arranged in a square on a white background, for example. Such systems are also referred to as two-dimensional bar codes or bar codes along two dimensions and they are known under the trade name "QR code", "Flashcode", or "DataMatrix". In all configurations, there exist algorithms that enable digital or alphanumeric information to be encoded in the form of bar codes having one or two dimensions.

Thus, given information is coded in the form of an image, i.e. the bar code, which can be applied in virtual or real manner on documents, articles, or even on living beings, so as to associate the coded information with the document, the article, or the living being carrying the bar code. In very many circumstances, the bar code is applied on a label which is then fastened on the corresponding article or document, for example. In summary, a bar code is a coded image representing information.

In order to be able to recover the information coded by the bar code, it is necessary to have a bar code reader device that enables the bar code to be acquired, initially by transforming it into the form of an electrical signal, and then possibly into the form of digital information representing the initial coded information. The digital information can then be processed in order to recover the initial information.

Bar code reader devices thus comprise in particular a bar code reader apparatus having:

a) a light emitter system having an incident light source capable of emitting incident light in an incident light direction towards a useful illuminated zone;

b) a light recovery system having a reflected light conditioning system and capable of recovering light reflected from a useful viewing zone and through the reflected light conditioning system; and c) a photoelectric sensor, comprising one or more sensor elements, for converting the reflected light recovered through the reflected light conditioning system into an electrical signal representative of the recovered reflected light;

Various types of light emitter system exist. In one type, the light source comprises a light beam, i.e. a beam of substantially parallel light presenting a diameter that is small compared with the zone that is to be illuminated, e.g. of the laser beam type. When such beams are intercepted by an opaque article, they thus cause a point-sized or almost point-sized spot of light to appear. The light spot presents a diameter that presents some minimum value in a working zone. In order to be able to read a bar code, such a light beam needs to be scanned within a useful working zone, which must correspond at least to the size of a bar code to be read. In other systems, the light source is a source that illuminates the entire working zone in a manner that is uniform or almost-uniform, without scanning.

The function of the photoelectric sensor is to recover the light reflected by the bar code and transform it into an electrical signal that is representative of the reflected light, and thus representative of the bar code, which also means that the electrical signal is representative of the information coded by the bar code.

The light recovery system is above all an optical system that serves to focus the light reflected by the bar code onto the photoelectric sensor, in such a manner that this focused light can be transformed into an electrical signal representative of the bar code with sufficient accuracy and density to enable the coded information to be retrieved by processing.

Bar code systems are generally standardized in such a manner that a bar code can be read by any type of apparatus. Nevertheless, in the context of such standardization, characteristics are defined in particular for bar code density. This density corresponds to a minimum size for the bars and for the gaps making up a bar code. With reference only to bar codes having one dimension made up of alternating contrasting bars and gaps, each standard specifies a minimum width for the narrowest bars and/or a minimum width for the gaps to ensure that when the bar codes are read, the narrowest bars and/or the narrowest gaps are recognized as such by the reader device.

In a reader device having a light emitter system that illuminates the entire illuminated useful zone, the resolution capability of the device is determined essentially by the ability of the sensor, looking through the light recovery system, to discriminate reliably between the bars and the gaps when they are situated in the useful viewing zone.

In a reader device having a light emitter system that emits a light beam, e.g. a laser beam or the like, the minimum diameter of the beam when it is intercepted by the bar code is an important parameter that can limit the resolution capability of the device, and thus limit the density of bar codes that can be read.

In the present document, a bar code is considered to present density that is higher than that of another bar code if the bars or the blocks constituting its black zones or its pale zones present a minimum dimension that is smaller. In other words, a higher density bar code can be applied to an area that is smaller than a lower density bar code when they both contain the same information coded using the same algorithm.

Typically, for the most common one-dimensional bar codes, a bar code must present code elements or bars having a minimum dimension of 0.254 millimeters (mm). Nevertheless, in certain applications, higher density bar codes are used in which the minimum dimension of the code elements presents a size of about 0.1 mm. Thus, a device having a resolution capability, i.e. an ability to discriminate, corresponding to code elements having a size of 0.2 mm, for example, is capable of reading the first type of bar code but is not capable of reading the second type of bar code, in the sense that error-free information cannot be retrieved from the bar code read with that device.

Naturally, a bar code reader device having a high resolution capability, corresponding to a high density bar code, is usually capable of reading bar codes of lower density. Nevertheless, such devices are by their very nature generally more expensive and they also often present a read field, i.e. a useful working zone, of smaller extent.

Various proposals have already been made to adapt a bar code reader device so as to enable it to read either bar codes placed at a far distance or else bar codes placed at a near distance. For example, Document U.S. Pat. No. 5,473,149 describes a bar code reader apparatus having a light recovery system with two sets of lenses, one used for reading bar codes at a first focus range and the other for reading bar codes at a second focus range. The device described in that document makes use of either one or the other of the sets of lenses, with the useful viewing zone corresponding to a first set of lenses and the useful viewing zone corresponding to the second set of lenses both being centered on substantially the central axis of the working zone of the device.

Document U.S. Pat. No. 6,909,080 describes an arrangement for a bar code reader apparatus in which auxiliary microlenses are arranged directly on the sensor. As a result, certain zones of the sensor receive light reflected through a recovery system via the auxiliary microlens having a first focal characteristic, while other zones of the sensor receive light reflected through a recovery system via another auxiliary microlens having a second focal characteristic, or not having any auxiliary microlens.

Document U.S. Pat. No. 7,762,466 describes a two-position lens system for a bar code reader apparatus. That lens system has a movable lens, specifically a diverging thin lens that can be moved between two positions: a working position and a retracted position. In the working position, the auxiliary lens forms part of the light recovery system in the sense that it passes the reflected light that the recovery system directs to the sensor. In the retracted position, the auxiliary lens is no longer in use and no longer intercepts the useful viewing zone of the sensor, such that the reflected light received by the sensor does not pass through the auxiliary lens.

There exists an unsatisfied need to be able, with a given bar code reader device, to read bar codes that may present different density characteristics.

To do this, the invention provides a bar code reader device comprising a bar code reader apparatus having:

a) a light emitter system having an incident light source capable of emitting incident light towards a useful illuminated zone;

b) a light recovery system having a reflected light conditioning system and capable of recovering light reflected from a useful viewing zone and through the reflected light conditioning system; and c) a photoelectric sensor, comprising one or more sensor elements, for converting the reflected light recovered through the reflected light conditioning system into an electrical signal representative of the recovered reflected light;

the device being characterized in that it includes an auxiliary optical system that is arranged permanently in the useful viewing zone at a distance from the sensor and in series with the reflected light conditioning system in such a manner that a fraction but not all of the useful viewing zone is intercepted by the auxiliary optical system.

According to other remarkable characteristics of a device of the invention:

The auxiliary optical system may define a reduced useful viewing zone that is not intercepted by the auxiliary optical system, that is of an extent that is sufficient for a first bar code arranged in the reduced useful viewing zone to be illuminated by the light emitter system and for the light reflected by said bar code to be received by the photoelectric sensor through the reflected light conditioning system but without being intercepted by the auxiliary optical system.

The device may be arranged in such a manner that the sensor is capable of receiving simultaneously through the reflected light conditioning system both light reflected by a first bar code in the reduced useful viewing zone without passing through the auxiliary optical system, and also light reflected by a second bar code in the auxiliary useful viewing zone through the auxiliary optical system.

The auxiliary optical system may be arranged outside the reflected light conditioning system and, along a reflected light direction, on the same side of the reflected light conditioning system as the useful viewing zone, on the side opposite from the sensor.

The auxiliary optical system may be designed to be capable of transmitting to the sensor an image of a complete bar code arranged in the auxiliary useful view zone.

The auxiliary optical system may be arranged inside the useful illuminated zone in such a manner that a fraction of the useful illuminated zone is intercepted by the auxiliary optical system and may thus define an auxiliary illuminated zone that is illuminated through the auxiliary optical system.

The auxiliary optical system may be arranged outside an incident light conditioning system along the direction of the incident light on the same side of the incident light conditioning system as the useful working zone.

The auxiliary optical system may be a converging optical system.

The incident light may include at least one incident light beam that is focused by the light emitter system to a first minimum focus size in a main useful working zone included in the useful viewing zone and in the useful illuminated zone, and the auxiliary optical system may focus the incident light beam to a second minimum focus size in an auxiliary useful working zone included in the auxiliary working viewing zone and in the auxiliary illuminated zone, said second minimum focus size being smaller than the first minimum focus size.

The auxiliary optical system may have an object focal plane situated behind the auxiliary useful working zone.

The auxiliary optical system may be arranged in the main useful working zone.

The auxiliary optical system may have a fixed focal length.

The auxiliary optical system may be a planoconvex thin lens, in particular a cylindrical planoconvex thin lens, or a spherical planoconvex thin lens.

The incident light may include at least one incident light beam and the incident light conditioning system may comprise a scanner device whereby the incident light beam is scanned over the main useful working zone at least in a first transverse direction perpendicular to the direction of the incident light.

The incident light beam may be scanned across the main useful working zone both in said first transverse direction and also in a second transverse direction perpendicular to the first transverse direction and to the incident light direction.

The incident light beam may be scanned across the main working zone in at least the first transverse direction between a first angular position to a second angular position, and the auxiliary optical system may be arranged in such a manner as to be situated on the path of the incident light beam between an intermediate position and one of the first and second angular positions.

The incident light source may be a single incident source, e.g. a single laser or a single light-emitting diode (LED).

The auxiliary optical system may occupy a position that is fixed relative to the sensor while the device is in operation.

The entire light recovery system may have a position that is fixed relative to the sensor during operation of the device.

The bar code reader apparatus may include a housing containing at least the light emitter system, the light recovery system, and the sensor, the housing possibly also including at least one transparent window through which the incident light and the reflected light pass, and the auxiliary optical system may then be arranged outside the housing.

A density threshold level may be a level above which the bar code reader apparatus is not capable of reading a bar code in the absence of the auxiliary optical system.

In another aspect of the invention, the device includes an auxiliary optical system that is arranged outside the housing, in the useful viewing zone, that intercepts a fraction but not all of the useful viewing zone, and that defines an auxiliary viewing zone for the sensor.

Furthermore, the invention also provides a machine for automatically analyzing a sample, the machine including at least one drawer onto which there can be loaded at least one element for analysis, such as a sample and/or a reagent and/or an analyzing tool, the drawer being movable from a loading position to a utilization position, the machine being characterized in that it includes a bar code reader device having any of the preceding characteristics for reading at least a bar code having density lower than a density threshold level and a second bar code having a density higher than the density threshold level.

According to other remarkable characteristics of a machine of the invention:

The machine may include a plurality of drawers arranged side by side and movable independently of one another between respective loading positions and utilization positions, and the bar code reader device may then be capable of reading a first bar code having a density lower than the density threshold level on a first drawer, and of reading through the auxiliary optical system a second bar code having a density higher than the density threshold level on a second drawer.

Along the incident light direction, the first drawer may be arranged closer to the incident light source than is the second drawer.

At least for a first bar-code reading position of the first drawer, the first bar code may be arranged in a main useful viewing zone and, at least for a first bar-code reading position of the second drawer, the second bar code may be arranged in an auxiliary useful viewing zone.

At least for one bar-code reading position of the second drawer, a bar code situated on the second drawer may be situated in the main useful viewing zone.

The drawers are movable between their loading and utilization positions along respective drawer paths that may be perpendicular to the direction of the incident light.

The drawers move between their loading and utilization positions along respective drawer paths that may be perpendicular to the direction of the incident light and to the first transverse direction.

The first and/or second bar codes may be arranged on the drawers in such a manner as to extend in a first transverse direction perpendicular to the direction of the incident light.

A housing of the bar code reader apparatus and the auxiliary optical system may be fastened independently of each other on a structure of the machine.

A housing of the bar code reader apparatus and the auxiliary optical system may be arranged at a distance from each other on the machine such that at least one drawer extends between the housing of the bar code reader apparatus and the auxiliary optical system.

Various other characteristics appear from the following description made with reference to the accompanying drawings, which show embodiments of the invention as non-limiting examples.

Figure 1:
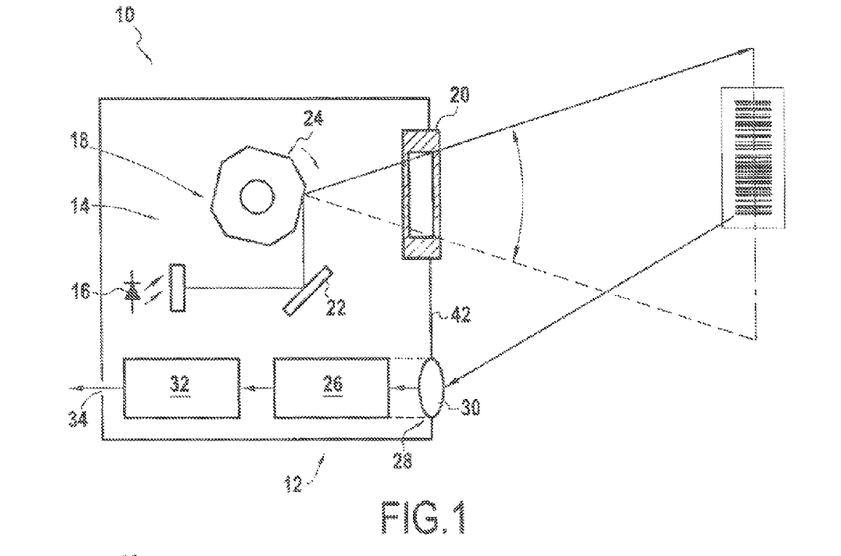
FIG. 1 is a diagrammatic view of a prior art bar code reader device.

FIG. 1 shows a bar code reader device 10 in accordance with the state of the art.

The bar code reader device 10 comprises a bar code reader apparatus 12 having a light emitter system 14 for illuminating a useful zone in which a bar code is to be presented in order to be read by the apparatus.

The light emitter system 14 has an incident light source 16 that may be monochromatic or polychromatic, e.g. comprising one or more individual sources, which may be in the form of a laser source, of one or more LEDs, or indeed an incandescent light source. The source 16 is preferably a single light source, e.g. a single laser source or a single LED.

The light emitter system 14 may be a system for emitting a field of light covering a useful illuminated zone in substantially uniform and substantially complete manner, without scanning. Alternatively, as in the embodiment shown, the system may be a system for emitting a light beam, e.g. in the form of a laser beam or of a very fine beam of collimated light. Typically, at any given instant, a light beam illuminates only a very small portion of the working zone. In the example shown, the incident light source 16 is a monochromatic laser source that emits a laser beam having a wavelength of 650 nanometers (nm), for example.

The light emitter system 14 may also include a system 18 for conditioning the incident light. The conditioning system 18 may be very simple, possibly being constituted solely by an optical diaphragm 20 for defining an illuminated zone. The conditioning system 18 may also include one or more reflecting mirrors 22 for steering the emitted light, e.g. arranged between the incident light source 16 and an outlet diaphragm 20. Nevertheless, in particular for light emitter systems that emit a light beam, the conditioning system may include in particular optical means for collimation/focusing/shifting purposes, such as lens systems, e.g. serving to generate a beam of parallel or almost parallel beams from a radiating point source. The incident light conditioning system 18 may also include light filter means, e.g. for eliminating certain frequencies from the light delivered by the light source 16. These filter means may comprise a simple filter and/or an interference filter. Thus, the incident light conditioning system 18 transforms the raw light delivered by the source 16 into incident light suitable for illuminating a bar code situated in a main useful working zone in such a manner that the incident light as reflected by the bar code can be recovered and decoded by the apparatus in such a manner as to recover the information coded by the bar code.

Furthermore, in particular with an incident light emitter source that emits a light beam, the light conditioning system 18 may include a scanner system 24 so that the incident light scans a defined zone in repetitive manner. The main useful illuminated zone is scanned across at least in a first transverse direction perpendicular to the direction of the incident light. This scanning is thus one-dimensional, so that the light beam is reflected so as to propagate always in the same plane. The scanning may be also be two-dimensional, e.g. when the beam is deflected so as to propagate in a plane and also to propagate in a direction perpendicular to that plane. In this second situation, the beam is also deflected in a second transverse direction, perpendicular to the first transverse direction and to the direction of the incident light.

In the first situation, if an opaque surface is presented in front of the incident light, the light beam thus moves along a line on the opaque surface. In the second situation, the beam moves along a succession of parallel lines on the opaque surface, in such a manner that if the parallel lines are close enough together it can be considered that the beam illuminates a surface zone. In the embodiment shown, the scanner system 24 has a reflecting octagonal prism that is driven in rotation about a central axis parallel to its reflecting side surfaces at a continuous speed. The prism is placed on the path of the light source between the incident light source 16 and an outlet diaphragm 20 in order to create one-dimensional scanning of a useful illuminated zone by the light beam.

As a result, the light emitter system 14 emits incident light in an incident light direction towards a useful illuminated zone, which zone may be determined as a function of the incident light passing through the conditioning system. The main direction of the incident light may be defined as being the direction of a light beam emitted by the apparatus and reaching the center of the illuminated zone. In a system that emits an extended light field, the light need not be parallel light but could be diverging light having a central direction as its main direction in the center of the illuminated zone. For a system that emits a light beam with scanning, the light beam presents a direction that is deflected on either side of the main direction.

In general manner, a useful zone in the meaning of the invention is a zone in three-dimensional space situated in front of the apparatus so that the light reflected by a bar code situated in this zone can be recovered and decoded by the apparatus so as to recover the information coded by the bar code. A useful zone may generally be defined by a viewing angle as seen from the optical conditioning system, the viewing angle being a one-dimensional plane angle or a two-dimensional solid angle. It may also generally be defined by a depth of field in the travel direction of the light.

Thus, the useful illuminated zone corresponds to the zone illuminated by the incident light source under conditions such that, if the light is reflected by a bar code arranged in the useful illuminated zone, the reflected light can be recovered and decoded by the apparatus so as to recover the information coded by the bar code.

The bar code reader apparatus 12 also has a photoelectric sensor 26 comprising one or more sensor elements for the purpose of converting recovered reflected light into an electrical signal representative of the recovered reflected light. This reflected light is seen by the sensor 26 through a light recovery system 28 that includes in particular a reflected light conditioning system 30. The light recovery system 28 is capable of recovering light reflected from a useful viewing zone, e.g. light reflected by a bar code. The useful viewing zone is thus associated with the sensor 26 and with the reflected light conditioning system 30 as being the zone in three-dimensional space in which an image situated in this zone can be seen by the sensor with a sufficient level of resolution.

The reflected light conditioning system 30 may include in particular an optical lens system, specifically a convergent system, enabling the image of an article such as a bar code positioned in the useful viewing zone to be focused on the sensor 26 with sharpness that is sufficient to enable the image to be decoded by the apparatus so as to recover the information coded by the bar code.

The bar code reader apparatus 12 may also include a signal processor device 32 that may include in particular analog and/or digital filters, one or more analog-to-digital converters, possibly a microprocessor with a memory, etc. . . . , for the purpose of converting the electrical signal representative of the recovered reflected light into digital data. The apparatus 12 generally also includes an analog or digital output 34 for communicating either the representative electrical signal or the digital data converted from that representative electrical signal to a computer processor system. The connection may be a wired connection or a wireless connection.

A main useful working zone may be defined for the bar code reader device to extend in a depth direction corresponding to the direction of the incident light and at least in a first transverse direction perpendicular to the direction of the incident light. This main useful working zone is contained in the intersection of the useful illuminated zone and the useful viewing zone.

This main useful working zone is such that when a first bar code of density lower than a density threshold level is placed in the main useful working zone, the first bar code can be illuminated by the light emitter system, and the light reflected by the first bar code can be converted into digital data by the sensor and the digital converter, without needing to pass via an auxiliary optical system.

Figure 2:
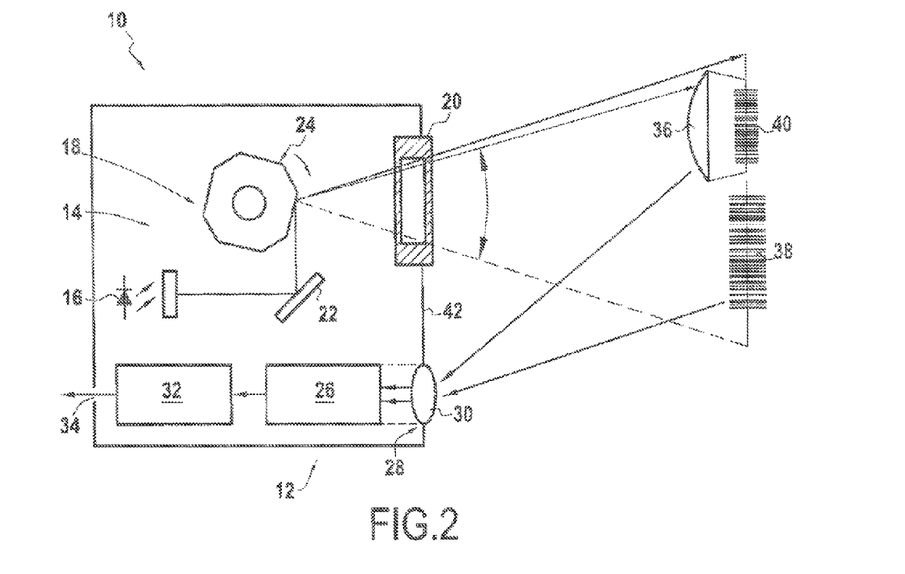
FIG. 2 is a diagrammatic view of a bar code reader device in an embodiment of the invention.

FIG. 2 shows an embodiment of a device of the invention. In this device, the bar code reader apparatus 12 is identical to the apparatus described with reference to FIG. 1, and is therefore not described again. In contrast, the device 10 also includes an auxiliary optical system 36 that is arranged permanently in the useful viewing zone at a distance from the sensor 26, and in series with the reflected light conditioning system 30 such that a fraction but not all of the useful viewing zone is intercepted by the auxiliary optical system.

The useful viewing zone is said to be intercepted by the auxiliary optical system with reference to the path of the light beam coming from an article situated in the useful viewing zone and reaching the sensor 26 through the light recovery system without passing via said auxiliary optical system. The useful viewing zone is said to be intercepted by the auxiliary optical system if the auxiliary optical system is situated on the path of the light beam.

The auxiliary optical system 36 may comprise a single optical element, or a plurality of optical elements, in particular elements arranged in series along the path of the light beam.

Preferably, the auxiliary optical system 36 is a converging optical system. In the example shown, this optical system is a single converging lens, preferably a thin lens. More precisely, the thin lens may be a planoconvex lens, or a cylindrical lens, or a spherical lens.

Since the auxiliary optical system 36 is arranged in the useful viewing zone, it creates an auxiliary useful viewing zone located, in the incident light direction, behind the auxiliary optical system. This auxiliary useful viewing zone corresponds to the zone of three-dimensional space that is seen by the sensor through the auxiliary optical system 36 in series with the reflected light conditioning system 30. This auxiliary useful viewing zone is such that when a second bar code is placed in this zone, the light reflected by the second bar code can be converted into digital data by the sensor and the signal processor device by passing successively through the auxiliary optical system 36 and the reflected light optical conditioning system 30.

The auxiliary optical system 36 is preferably arranged outside the reflected light conditioning system 30, and along the direction of the reflected light on the same side of the reflected light conditioning system 30 as the useful viewing zone, i.e. on the side opposite from the sensor 26. Under such circumstances, the auxiliary optical system 36 is thus also remote from the sensor in the sense that it is not in contact therewith.

In the embodiment shown in the figures, the auxiliary optical system defines a reduced useful viewing zone that is not intercepted by the auxiliary optical system, which reduced useful viewing zone is of an extent that is sufficient for a first bar code arranged therein to be illuminated by the light emitter system and for the light reflected by said bar code to be received by the photoelectric sensor without being intercepted by the auxiliary optical system 36. In terms of angular extent as seen from the inlet to the reflected light recovery system 28, the reduced useful viewing zone preferably represents more than 50% of the main useful viewing zone, and more preferably more than 75%.

Preferably, as shown in FIG. 2, the bar code reader device of the invention is arranged in such a manner that the sensor 26 is capable of receiving simultaneously light reflected by a first bar code 38 in the reduced useful viewing zone without passing through the auxiliary optical system 36, and light reflected by a second bar code 40 in the auxiliary useful viewing zone and passing through the auxiliary optical system 36.

Furthermore, the bar code reader device is arranged in such a manner that the auxiliary optical system 36 is capable of transmitting an image to the sensor 26 of a complete bar code 40 arranged in the auxiliary useful viewing zone. In other words, the auxiliary viewing zone corresponds to a viewing angle that is sufficient for the extent of the viewing angle, in its depth of field, to accommodate a complete bar code, and under all circumstances at least a bar code presenting density higher than a density threshold level.

In the example shown, the auxiliary optical system 36 is arranged inside the useful illuminated zone in such a manner that a portion of the useful illuminated zone is intercepted by the auxiliary optical system and defines an auxiliary illuminated zone that is illuminated through the auxiliary optical system. This auxiliary useful illuminated zone extends, in the incident light propagation direction, behind the auxiliary optical system 36, i.e. behind the auxiliary optical system 36 as seen from the incident light source, or indeed to the right of the auxiliary optical system 36 as shown in FIG. 2.

When, as shown in the figures, the incident light includes at least one incident light beam, this light beam forms a light spot on an opaque article arranged in the useful working zone, which spot is preferably contained in a diameter of about 1 mm. Over the depth of field, this diameter may vary insofar as such a beam is never perfectly parallel, even for a laser beam. Under all circumstances, it is assumed that the beam is focused by the light emitter system to a first minimum focus size in the main useful working zone lying in the useful viewing zone and in the useful illuminated zone. In an aspect of the invention, when the incident light includes an incident light beam, and when the auxiliary optical system intercepts the useful illuminated zone, the auxiliary optical system focuses the incident light beam to a second minimum focus size in an auxiliary useful working zone lying in the auxiliary useful viewing zone and in the auxiliary illuminated zone, said second minimum focus size being smaller than the first minimum focus size. As a result, the incident light beam, which in the absence of the auxiliary optical system would be not sufficiently accurate to enable a bar code of density higher than a density threshold level to be decoded, can, by being focused through the auxiliary optical system, enable such a bar code situated in the auxiliary useful working zone to be read.

The auxiliary optical system 36 is preferably arranged outside the incident light conditioning system along the incident light direction on the same side of the incident light conditioning system 18 as the useful working zone.

Preferably, the auxiliary optical system has an object focal plane situated behind the auxiliary useful working zone. In other words, a high density bar code is preferably placed behind the auxiliary optical system as seen from the bar code reader apparatus.

The auxiliary optical system may be arranged in the main useful working zone, or close thereto in the depth of field direction. The auxiliary optical system 36 is preferably the only optical system passing the incident light and the light reflected in the main working zone. If the auxiliary optical system comprises a plurality of optical elements in series, the incident and reflected light beams preferably pass through the same optical elements of the auxiliary optical system.

In the example shown, the auxiliary optical system 36 has a fixed focal length, thus making it possible to use optical components that are simple. Likewise, while the device is in operation, the auxiliary optical system 36 has a position that is fixed relative to the sensor 26, and also preferably relative to the source 16. Likewise, the entire light recovery system has a position that is fixed relative to the sensor while the device is in operation. In other words, the device is capable of reading a first bar code situated in the reduced useful working zone and/or a second bar code situated in the auxiliary useful working zone without there being any need to move the auxiliary optical system, and preferably without modifying the operation of the light recovery system and/or of the incident light conditioning system. Furthermore, in the example shown, neither the sensor, nor the incident light source need to be moved while the device is in operation in order to read the first bar code or the second bar code as mentioned above.

In the context of a device with a system for emitting a scanning light beam, the incident light beam is scanned across the main working zone at least in the first transverse direction between a first angular position and a second angular position. Under such circumstances, the auxiliary optical system is preferably arranged so as to be situated on the path of the incident light beam between an intermediate position and one of the first and second angular positions. In other words, the auxiliary optical system 36 intercepts only a fraction of the useful illuminated zone.

In the embodiment as shown in FIG. 2, the bar code reader apparatus 12 includes a housing 42 that contains at least the light emitter system 14, the light recovery system 28, and the sensor 26. As shown, the housing 42 may include at least one transparent window through which the incident light and the reflected light pass. Specifically, two transparent windows are shown, one for the incident light and the other for the reflected light. Furthermore, in the embodiment shown, the window for the incident light is constituted by the optical diaphragm 20 and the window for the reflected light is constituted by the lens 30 forming part of the reflected light conditioning system 28. Other configurations are possible for the transparent window. Naturally, the concept of transparency should be assessed relative to the incident light and relative to the reflected light. In practice, the housing is preferably closed, and possibly even leaktight. Likewise, as shown in FIG. 2, the signal processor device 32 is also incorporated in the housing, and the output 34 may comprise a connector carried by the housing 42.

In a version of the invention, such as that shown in the figures, the auxiliary optical system is arranged outside the housing. As explained below, the auxiliary optical system need not even be fastened to the housing. It can thus be understood that the auxiliary optical system is independent of the bar code reader apparatus 12, which is perfectly capable of operating without the auxiliary optical system, at least for reading bar codes that present density lower than a density threshold level for that apparatus. In other words, the density threshold level is a level above which the bar code reader apparatus is not capable of reading a bar code without the auxiliary optical system.

The bar code reader device of the invention can thus read bar codes that may be presented at different distances from the reader apparatus, that may present different density characteristics, and that may also be present simultaneously, under certain circumstances.

A particular application of the bar code reader device of the invention is described below. Such a bar code reader device may be used in a machine for automatically analyzing a sample, and in particular in a machine of the type sold by the Applicant under the trade mark "VIDAS 3". This type of machine acts automatically to perform biological analyses on biological samples, with it being possible for a given machine to perform different analyses on a single sample or on different samples.

Figure 3:
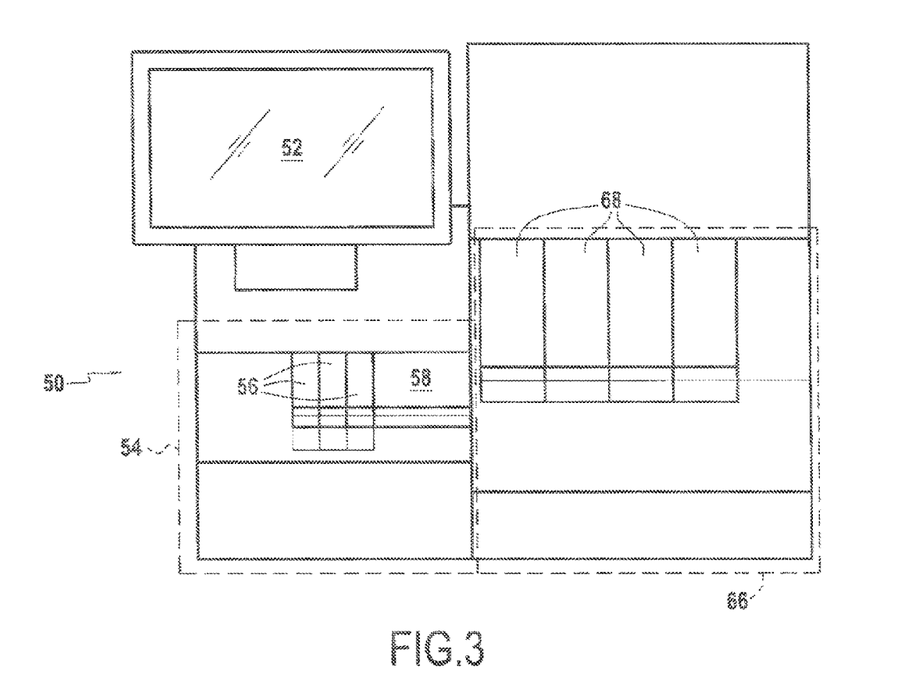
FIG. 3 is a view of a machine for automatically analyzing a sample, the machine being suitable for incorporating a bar code reader device of the invention.
Figure 4:
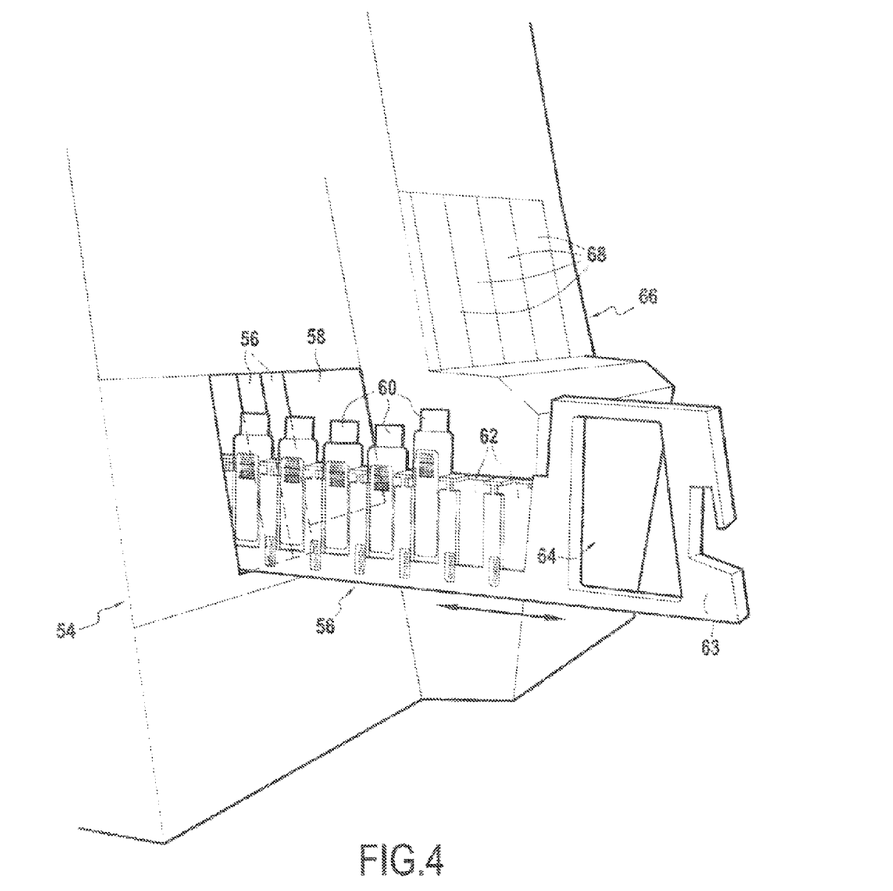
FIG. 4 is a perspective view of a portion of a machine as shown in FIG. 3, showing a first drawer in an intermediate position between a loading position and a utilization position.

A machine of this type is shown in front view in FIG. 3. On the visible front face of this machine 50, there can be seen a display screen 52 in a top left portion that may be a touch screen so as to act also as man-machine interface means enabling a user to input data, select functions, etc. . . . . In a bottom left portion, preferred to as the pre-analysis portion 54, there can be seen a series of three primary drawers 56 and a second secondary drawer 58, which are arranged side by side. Each of these drawers 56, 58 is designed to be movable independently of the others between a loading position and a utilization position, in this example by sliding linearly along a horizontal path perpendicular to the front face. The concept of "front", "rear", "horizontal", "vertical", etc. are used herein by way of indication and with reference to the normal orientation of such a machine, as shown in the figures. As can be seen in FIG. 4, the primary drawers 56 are designed to receive by way of example samples, diluents, reagents, reference substances, etc., e.g. contained in containers 60 of various shapes. Each first primary drawer 56 may thus carry a plurality of containers 60, each container 60 being received in a predetermined location 62 of the primary drawer 56. It should also be observed that each of the first primary drawers 56 may be removable from the machine in order to enable the drawers to be prepared and loaded outside the machine, thus enabling this preparation step to be performed while the machine is in operation with other primary drawers in the utilization position. Each primary drawer 56 may include one or more bar codes, e.g. for identifying the various primary drawers 56 and/or the various locations. The various containers 60 or other articles that are to be received in the locations of these drawers may also include bar codes. It should also be observed that each primary drawer 56 includes, at its front end, a grip handle 63 and a grip window 64, that is open in a horizontal lateral direction perpendicular to the front/rear direction of the path of the primary drawer 56. The container loading zone of the primary drawer is situated behind the grip window 64, such that the grip window lies between the grip handle 63 forming the front end of the drawer 56 and the rear loading zone of the drawer. It should also be observed that the bar codes preferably all face sideways, i.e. in a plane that is substantially vertical and parallel to the sliding paths of the drawers, facing to the left of the machine in the orientation shown in the figures.

Figure 5:
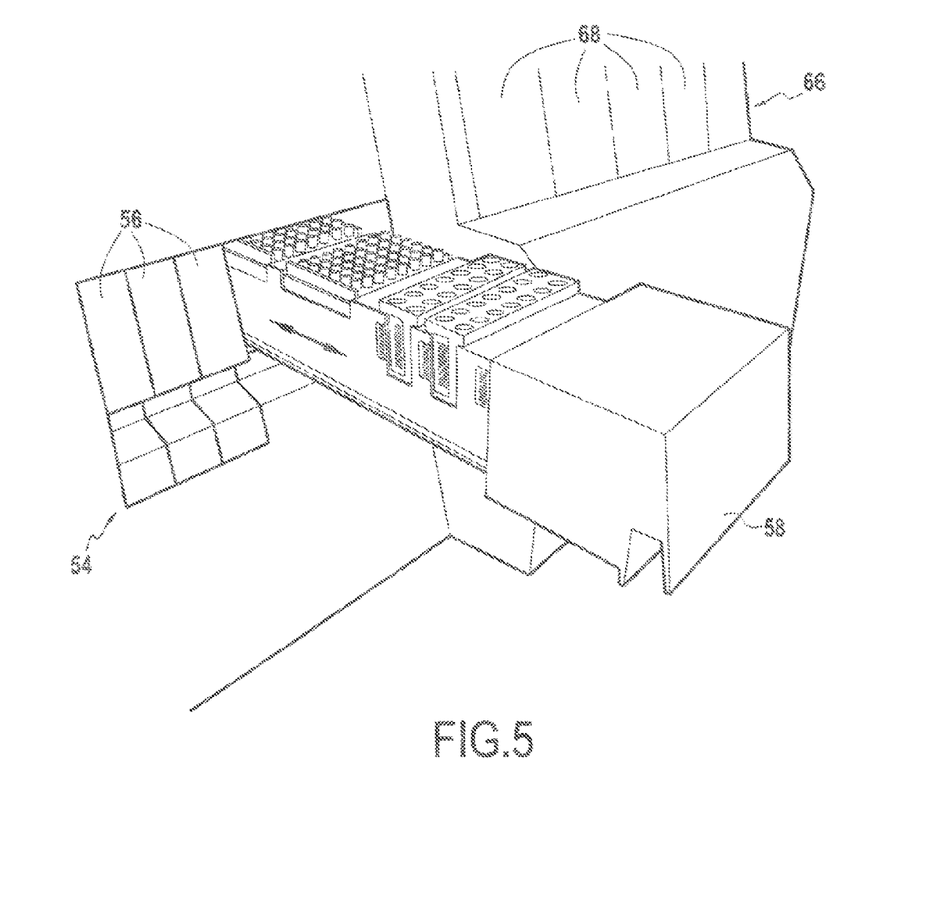
FIG. 5 is a perspective view of a portion of a machine as shown in FIG. 3, showing a second drawer in an intermediate position between a loading position and a utilization position.

In FIG. 5, there can be seen a secondary drawer 58 that, in this example application, is for example for receiving analysis tools, e.g. discardable tools that are used by the machine in the automatic analysis process. These tools, e.g. pipette tips or dilution cups, may be carried by removable trays that can be arranged on the secondary drawer 58, preferably in predetermined locations. The secondary drawer may also be removable so that a plurality of secondary drawers 58 can be used in alternation on the machine, thus giving rise to a potential need to identify which secondary drawer 58 is installed in the machine, which can justify the presence of a bar code on each of these secondary drawers. Furthermore, the various removable trays carried by a secondary drawer may also be provided with respective bar codes.

Furthermore, FIG. 3 shows a right-hand portion of the machine, sometimes referred to as the analysis portion 66, that also includes drawers 68, suitable for example for receiving discardable analysis bars.

Figure 6:
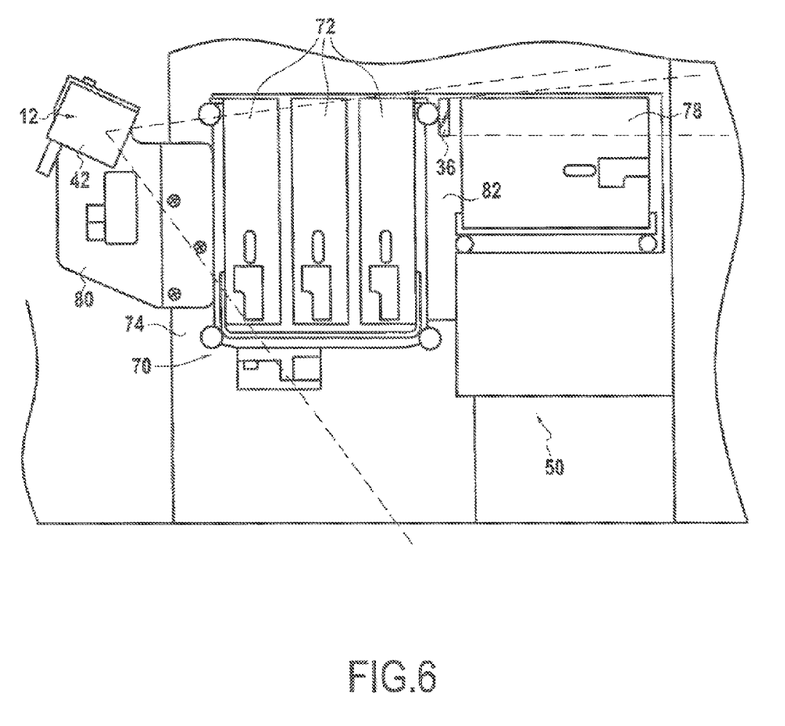
FIG. 6 is a front view of a portion of a machine as shown in FIG. 3 showing only the structure of this portion of the machine on which a bar code reader device of the invention is installed.

FIG. 6 shows a portion of the structure 70 of the machine 50, specifically and by way of example the portion corresponding to the pre-analysis portion 54 of the machine. There can be seen three housings 72, each serving to receive one of the three primary drawers 56 and opening out into a vertical front wall 74 of the structure. More precisely, only the loading zone of each drawer 56 is to be engaged inside these housings 72, including when the primary drawers 56 are in the utilization position, such that, in the utilization position, the grip handle 63 and the grip window 64 both remain arranged in front of the vertical front wall 74 of the structure.

In FIG. 6, there can also be seen a secondary drawer 58 engaged in a corresponding housing 78. It should also be observed that there is preferably an offset in the horizontal sliding direction of the drawers between the vertical front wall 74 and the structure 70 and the front face of the machine, as shown in FIG. 3, which front face is made up of bodywork panels and of the front faces of the grip handles of the drawers 56 and 58. This offset leaves a gap that lies between the vertical front wall 74 and the front face of the machine as formed in particular by the bodywork panels.

In FIG. 6, it can be seen that the machine is provided with a bar code reader device of the invention for reading at least a bar code of density lower than the density threshold level and a second bar code of density higher than the density threshold level.

The device is preferably installed on the machine so as to be capable of reading, at least on a first drawer, a first bar code of density lower than the density threshold level, and at least on a second drawer, through the auxiliary optical device, a second bar code having a density higher than the density threshold level. For example, the first drawer may be a primary drawer 56 and the second drawer may be the secondary drawer 58.

In the example shown, it can thus be seen that the bar code reader apparatus 12 is mounted on a plate 80 fastened to the front wall 74 of the structure 70. The apparatus is thus received in the gap between the vertical front face 74 of the structure 70 and the front face of the machine. The apparatus 12 is arranged in such a manner that the main directions of the incident and reflected light as emitted and received by the apparatus are contained in a front plane containing the vertical and lateral directions, which are perpendicular to the sliding direction of the drawers 56, 58. Thus, the drawers move between their loading positions and their utilization positions along drawer paths that are perpendicular to the incident light direction and to the first transverse scanning direction.

In the example shown, the main useful working zone of the apparatus 12 extends in the front plane over an angular extent of about 60° so as to cover in full or almost in full a volume through which each of the drawers 56, 58 passes. In the example shown, the apparatus 12 is in a top left position relative to the loading bay formed by the drawers 56, 58, and a little in front of the front wall 74. Nevertheless, the apparatus 12 is arranged inside the bodywork of the machine, and in particular behind a front facade. In a particular aspect, when one of the primary drawers 56 is in the utilization position, pushed fully into its housing 72, its grip window 64 is arranged to correspond to the position of the front plane in which the incident light beam is scanned. Thus, when a primary drawer or a secondary drawer is in a loading position or an intermediate position, its side face that faces to the left, i.e. towards the bar code reader apparatus 12, is thus exposed to the incident light so that a bar code positioned on this side face can be illuminated by the apparatus and can reflect light that can be recovered and decoded by the apparatus 12. If the drawer in question is not the primary drawer 56 situated furthest to the left, i.e. the drawer situated closest to the apparatus 12 and thus to the light source 16, the bar code is illuminated and the light reflected by the bar code is recovered through the grip window(s) 63 of the or each primary drawer situated to the left of the drawer in question.

The optical reader apparatus 14 is used mainly for reading and decoding bar codes carried by one of the three primary drawers 56. As a result, the arrangement is such that the zone occupied by these primary drawers 56 in the front plane scanned by the incident light coincides with the main useful working zone of the bar code reader apparatus 12.

As can be seen more particularly in FIG. 6, the auxiliary optical system 36, which in this example is constituted by a single planoconvex converging thin lens, is fastened, e.g. by means of a plate, on the structure 70, and specifically also on its front wall 74. More precisely, the auxiliary optical system 36 is fastened on a portion 82 of the front wall 74 that lies between the housings 72 for receiving the primary drawers 56 and the housing 78 for receiving the secondary drawer 58. Thus, with the auxiliary optical system 36 in this position, the auxiliary useful viewing zone and the auxiliary useful illuminated zone lie, in the lateral propagation direction of the incident light, behind the main useful working zone corresponding to the primary drawers 56. Consequently, the bar code reader apparatus 12 and the auxiliary optical system 36 are spaced apart from each other on the machine 50 such that at least one drawer 56 extends between the bar code reader apparatus 12, and in particular the housing of the apparatus, and the auxiliary optical system 36.

Nevertheless, it can be seen that the auxiliary optical system 36 is arranged in the front plane in such a manner as to intercept only a very small fraction of the useful illuminated zone and of the useful viewing zone of the apparatus 12. The zone in which the auxiliary optical system is situated corresponds substantially to an angular end portion of the useful working zone. As a result, the reduced useful working zone, which corresponds to the working zone that is not intercepted by the auxiliary optical system 36, extends under the auxiliary optical system 36. The auxiliary useful working zone, which corresponds to the zone in which a bar code is illuminated through the auxiliary optical system 36 and for which the light reflected by the bar code is seen by the sensor 26 likewise through the auxiliary optical system, corresponds substantially to a high portion of the drawer 58. As a result, a bar code arranged on the secondary drawer 58 in this high portion is seen by the bar code reader apparatus through the optical auxiliary system 36. In contrast, a bar code arranged on a low portion of the drawer 58 is thus arranged in the reduced main useful working zone and is seen by the apparatus 12 without the incident light nor the reflected light passing through the main optical system. Thus, in at least one position for reading bar codes on the second drawer, a bar code situated on the second drawer is arranged in the main useful working zone.

Insofar as the bar code reader apparatus 12 is a one-dimensional laser scanning apparatus, the bar codes are preferably arranged on the drawers so as to extend in the first transverse scanning direction. Specifically, since the scanning direction is a direction contained in the vertical front plane, the bar code is thus preferably arranged with its bars and gaps spaced apart from one another in the vertical direction, the bars thus being horizontal bars.

In the example shown in the figures, the planoconvex lens used as the auxiliary optical system 36 is a lens in which the convex surface is a cylindrical surface having a radius of curvature of 26.7 mm. The height of the lens in the first transverse scanning direction, specifically the vertical direction of the machine, is 18 mm, for example. The axis of the cylindrical surface of the lens is arranged perpendicularly to the first transverse scanning direction, so as to be arranged horizontally, parallel to the sliding direction of the drawer. The width of the lens along the axis of the cylindrical surface is 12 mm, for example. The focal length of the lens is about 25 mm and the lens is positioned on the machine so as to be at least 20 mm from the side surface of the drawer 58 that carries the bar codes. Furthermore, the lens is positioned at about 150 mm from the bar code reader apparatus 12. With such a device, tests have shown that it is possible to read bar codes on the side face of the secondary drawer 58 that have a density of 3.3 thousandths of an inch (mils) while using a bar code reader apparatus 12 of resolution, in the absence of an auxiliary optical device, that does not enable bar codes to be read having a density higher than 10 mils, i.e. that does not enable bar codes to be read having bars that are less than 10/1000 of an inch apart.

The invention is not limited to the examples described and shown, since various modifications may be made thereto without going beyond the ambit of the invention.

The invention claimed is:

1. A bar code reader device (10) comprising a bar code reader apparatus (12) having:
   a) a light emitter system (14) having an incident light source (16) emitting incident light towards a useful illuminated zone;
   b) a light recovery system (28) having a reflected light conditioning system (30), and which recovers light reflected from a useful viewing zone and through the reflected light conditioning system (30); and
   c) a photoelectric sensor (26) for converting the reflected light recovered through the reflected light conditioning system (30) into an electrical signal representative of the recovered reflected light;
   the device (10) being characterized in that it includes an auxiliary optical system (36) that is arranged permanently in the working viewing zone at a distance from the sensor (26) and in series with the reflected light conditioning system (30) in such a manner that a fraction but not all of the useful viewing zone is intercepted by the auxiliary optical system (36).

2. A bar code reader device according to claim 1, characterized in that the auxiliary optical system (36) defines a reduced useful viewing zone that is not intercepted by the auxiliary optical system, that is of an extent that is sufficient for a first bar code (38) arranged in the reduced useful viewing zone to be illuminated by the light emitter system and for the light reflected by said bar code (38) to be received by the photoelectric sensor without being intercepted by the auxiliary optical system.

3. A bar code reader device according to claim 1, characterized in that the device (10) is arranged in such a manner that the sensor (26) simultaneously receives both light reflected by a first bar code (38) in the reduced useful viewing zone without passing through the auxiliary optical system (36), and also light reflected by a second bar code (40) in the auxiliary useful viewing zone through the auxiliary optical system (36).

4. A bar code reader device according to claim 1, characterized in that the auxiliary optical system (36) is arranged outside the reflected light conditioning system (30) and, along a reflected light direction, on the same side of the reflected light conditioning system (30) as the main useful viewing zone, on the side opposite from the sensor (26).

5. A bar code reader device according to claim 1, characterized in that the auxiliary optical system (36) transmits to the sensor (26) an image of a complete bar code arranged in the auxiliary useful viewing zone.

6. A bar code reader device according to claim 1, characterized in that the auxiliary optical system (36) is arranged inside the useful illuminated zone in such a manner that a fraction of the useful illuminated zone is intercepted by the auxiliary optical system (36) and defines an auxiliary illuminated zone that is illuminated through the auxiliary optical system (36).

7. A bar code reader device according to claim 1, characterized in that the auxiliary optical system (36) is arranged outside an incident light conditioning system (18) of the apparatus (12) along the direction of the incident light on the same side of the incident light conditioning system (18) as the useful illuminated zone.

8. A bar code reader device according to claim 1, characterized in that the auxiliary optical system (36) is a converging optical system.

9. A bar code reader device according to claim 8, characterized in that the incident light includes at least one incident light beam that is focused by the light emitter system (14) to a first minimum focus size in a main useful working zone included in the useful viewing zone and in the useful illuminated zone, and in that the auxiliary optical system (36) focuses the incident light beam to a second minimum focus size in an auxiliary useful working zone included in the auxiliary useful viewing zone and in an auxiliary illuminated zone, said second minimum focus size being smaller than the first minimum focus size.

10. A bar code reader device according to claim 1, characterized in that the auxiliary optical system (36) has an object focal plane situated behind the auxiliary useful working zone.

11. A bar code reader device according to claim 1, characterized in that the auxiliary optical system (36) is arranged in the main useful working zone.

12. A bar code reader device according to claim 1, characterized in that the auxiliary optical system (36) has a fixed focal length.

13. A bar code reader device according to claim 1, characterized in that the auxiliary optical system (36) occupies a position that is fixed relative to the sensor while the device is in operation.

14. A bar code reader device according to claim 1, characterized in that the entire light recovery system (28) has a position that is fixed relative to the sensor (26) during operation of the device.

15. A bar code reader device according to claim 1, characterized in that the bar code reader apparatus (12) includes a housing (42) containing at least the light emitter system (14), the light recovery system (28), and the sensor (26), and in that the auxiliary optical system (36) is arranged outside the housing (42).

16. A machine (50) for automatically analyzing a sample, the machine including at least one drawer (56, 58) configured to receive at least one element, the drawer being movable from a loading position to a utilization position, the machine being characterized in that it includes a bar code reader device (10) according to claim 1 for reading at least a first bar code (38) having a density lower than a density threshold level and a second bar code having a density higher than a density threshold level.

17. A machine according to claim 16, characterized in that a housing (42) of the bar code reader apparatus (12) and the auxiliary optical system (36) are fastened independently of each other on a structure (70) of the machine (50).

18. A machine according to claim 16, characterized in that a housing (42) of the bar code reader apparatus (12) and the auxiliary optical system (36) are arranged at a distance from each other on the machine (50) such that at least one drawer (56) extends between the housing (42) of the bar code reader apparatus (12) and the auxiliary optical system (36).

19. A machine according to claim 16 in combination with the bar code reader device of claim 8, the machine being characterized in that it includes a plurality of drawers arranged side by side and movable independently of one another between respective loading positions and utilization positions, and in that the bar code reader device (10) reads a first bar code (38) having a density lower than the density threshold level on a first drawer (56), and of reading through the converging auxiliary optical system (36) a second bar code (40) having a density higher than the density threshold level on a second drawer (58).

20. A machine according to claim 19, characterized in that, along the incident light direction, the first drawer (56) is arranged closer to the incident light source (16) than is the second drawer (58).

21. A machine according to claim 19, characterized in that, at least for one bar-code reading position of the first drawer (56), the first bar code is arranged in a main useful viewing zone and, at least for one bar-code reading position of the second drawer (58), the second bar code is arranged in an auxiliary useful viewing zone.

22. A machine according to claim 19, characterized in that, at least for one bar-code reading position of the second drawer (58), a bar code situated on the second drawer is situated in the main useful viewing zone.

23. A machine according to claim 19, characterized in that a housing (42) of the bar code reader apparatus (12) and the auxiliary optical system (36) are fastened independently of each other on a structure (70) of the machine (50).

24. A machine according to claim 19, characterized in that a housing (42) of the bar code reader apparatus (12) and the auxiliary optical system (36) are arranged at a distance from each other on the machine (50) such that at least one drawer (56) extends between the housing (42) of the bar code reader apparatus (12) and the auxiliary optical system (36).

* * * * *